United States Patent [19]

Suzuki et al.

[11] Patent Number: 5,161,179
[45] Date of Patent: Nov. 3, 1992

[54] BERYLLIUM WINDOW INCORPORATED IN X-RAY RADIATION SYSTEM AND PROCESS OF FABRICATION THEREOF

[75] Inventors: Kunio Suzuki; Nobuaki Tomita, both of Shizuoka, Japan

[73] Assignee: Yamaha Corporation, Hamamatsu, Japan

[21] Appl. No.: 661,135

[22] Filed: Feb. 27, 1991

[51] Int. Cl.⁵ .............................. G21K 1/00
[52] U.S. Cl. .................... 378/161; 378/140; 228/194
[58] Field of Search ............... 378/161, 140; 228/193, 228/194, 195, 263.13, 263.14, 263.15, 263.16, 263.18

[56] References Cited

U.S. PATENT DOCUMENTS

| | | | |
|---|---|---|---|
| 2,394,984 | 2/1946 | Claussen | 378/161 |
| 3,222,558 | 12/1965 | Hoeschen | 378/161 |
| 3,608,490 | 9/1971 | O'Keefe | 228/190 |
| 3,878,417 | 4/1975 | Eberlein | 378/161 |
| 4,431,709 | 2/1984 | Bronnes et al. | 378/161 |
| 5,017,245 | 5/1991 | Suzuki et al. | |

OTHER PUBLICATIONS

"Metals Handbook Ninth Ed.–vol. 6 Welding, Brazing, and Soldering", pp. 677–679, no date.

*Primary Examiner*—David P. Porta
*Attorney, Agent, or Firm*—Burns, Doane, Swecker & Mathis

[57] ABSTRACT

A beryllium window comprises a disk-shaped beryllium plate containing beryllium as an essential element, a welding film partially merged into the outer peripheral portion of the beryllium plate and formed of a substance having at least one element selected from the group consisting of silver, gold, nickel and copper, and a reinforcing unit of a stainless steel, and the welding film is partially merged into the reinforcing unit, wherein the welding film fixes the beryllium plate to the reinforcing unit through diffusion welding so that the beryllium window is less deformative against heat stress.

18 Claims, 6 Drawing Sheets

PRIOR-ART

BERYLLIUM WINDOW INCORPORATED IN X-RAY RADIATION SYSTEM AND PROCESS OF FABRICATION THEREOF

FIELD OF THE INVENTION

This invention relates to a beryllium window incorporated in an x-ray radiation system and, more particularly, to the structure of the beryllium window less deformative against heat stress in a process of fabrication thereof.

DESCRIPTION OF THE RELATED ART

A typical example of the x-ray aligner is illustrated in FIG. 1 of the drawings and largely comprises an electron gun 1, a target holder used for retaining a palladium target 2 and a wafer holder where a semiconductor wafer 4 is mounted. When the electron gun 1 emits electron beams towards the palladium target 2, an x-ray radiates from the palladium target 2 through a beryllium window 5. If the wafer holder 3 is located under the beryllium window 5, the semiconductor wafer 4 is exposed to the x-ray, and a pattern is transferred from an x-ray mask (not shown) to the wafer 4. The beryllium window 5 is provided between a target chamber 6 and an exposed space (not shown) for partitioning, and a beryllium thin film is presently the most appropriate in view of the transmittance of x-ray and of the mechanical strength of the window.

However, a thin beryllium plate can not be directly attached to the inner wall of the x-ray aligner, and a reinforcing frame (not shown) is used for the attachment. Namely, the thin beryllium plate is directly bonded, brazed or welded to the reinforcing frame, and the reinforcing frame is attached to the inner wall of the x-ray aligner. An adhesive compound is provided between the thin beryllium plate and the reinforcing frame, and an electron beam is usually used in the welding. The beryllium window thus fabricated is, thereafter, baked in vacuum at 200 degrees to 400 degrees in centigrade.

Following problems are encountered in the prior art beryllium window depending upon the way of fixing. Namely, if the thin beryllium plate is bonded to the reinforcing frame with an adhesive compound, the beryllium window is less resistive against heat and, accordingly, damaged in the baking treatment in vacuum.

The brazing exposes the thin beryllium plate to heat at 800 degrees to 1000 degrees in centigrade, and the heat deteriorates the mechanical strength of the thin beryllium plate. If the thickness is increased, the beryllium plate may well withstand. However, such a thick beryllium plate is less transmissible for the x-ray. Thus, there is a trade-off between the mechanical strength and the transmissibility of the beryllium plate brazed to the reinforcing frame.

The welding with an electron-beam tends to deform the beryllium plate due to heat produced by the strong electron beam. If the beryllium plate is decreased in thickness so as to improve the transmissibility, the heat deformation becomes serious.

SUMMARY OF THE INVENTION

It is therefore an important object of the present invention to provide a beryllium window which is free from heat attack.

It is also an important object of the present invention to provide a process of fabricating a beryllium window well withstanding heat.

To accomplish these objects, the present invention proposes to weld a beryllium plate to a reinforcing member through a diffusion welding.

In accordance with one aspect of the present invention, there is provided a beryllium window comprising a) a beryllium plate containing beryllium as an essential element, b) a reinforcing unit for retaining the beryllium plate, and c) a welding film merged into a part of the beryllium plate and a part of the reinforcing unit and formed of a substance having at least one element selected from the group consisting of silver, gold, nickel and copper, the reinforcing unit being formed of a substance allowing the at least one element to diffuse thereinto.

In accordance with another aspect of the present invention, there is provided a process of fabricating a beryllium window comprising the steps of: a) preparing a beryllium plate containing beryllium as an essential element, a welding substance containing at least one element selected from the group consisting of silver, gold, nickel and copper, and a reinforcing unit formed of a substance allowing aforesaid at least one element to diffuse thereinto; b) forming a film of the welding substance on a part of the beryllium plate; and c) welding the beryllium plate to the reinforcing unit through a diffusion of the welding substance into the beryllium plate and the reinforcing unit.

In accordance with still another aspect of the present invention, there is provided a process of fabricating a beryllium window comprising the steps of: a) preparing a beryllium plate containing beryllium as an essential element, a welding substance containing at least one element selected from the group consisting of silver, gold, nickel and copper, and a reinforcing unit formed of a substance allowing aforesaid at least one element to diffuse thereinto; b) forming a film of the welding substance on a part of the reinforcing unit; and c) welding the beryllium plate to the reinforcing unit through a diffusion of the welding substance into the beryllium plate and the reinforcing unit.

BRIEF DESCRIPTION OF THE DRAWINGS

The features and advantages of a beryllium window and a process of fabrication thereof according to the present invention will be more clearly understood from the following description taken in conjunction with the accompanying drawings in which.

DESCRIPTION OF THE PREFERRED EMBODIMENTS

First Embodiment

Figure 1:
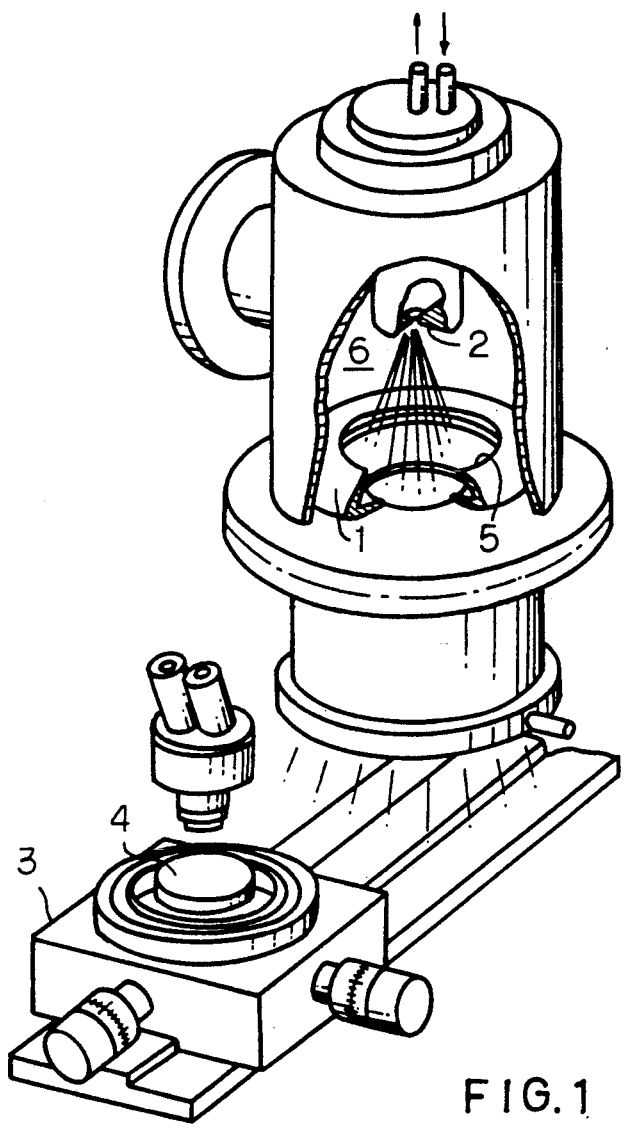
FIG. 1 is a perspective view showing a prior art x-ray aligner.
Figure 2:
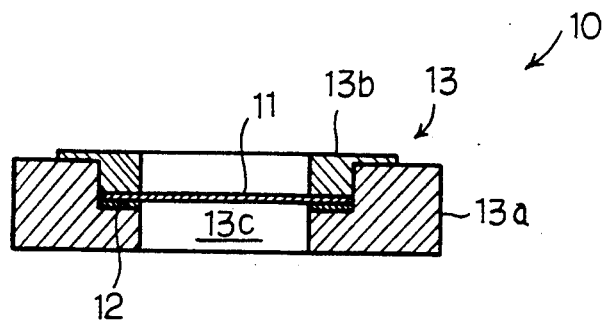
FIG. 2 is a cross sectional view showing the structure of a beryllium window according to the present invention.
Figure 3:
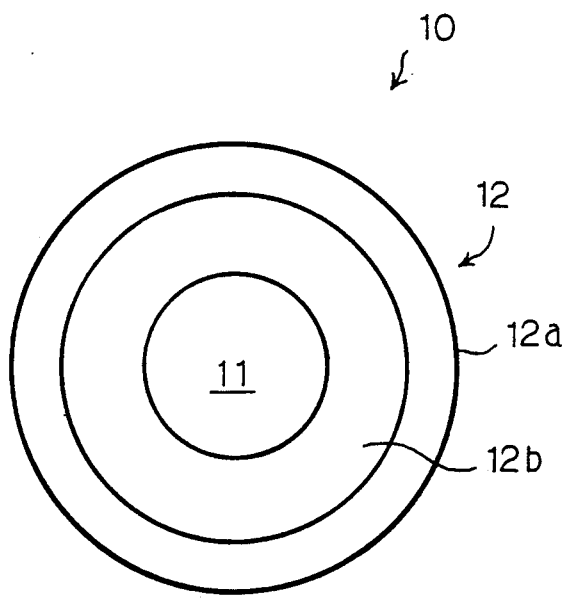
FIG. 3 is a plan view showing the beryllium window shown in FIG. 2.

Referring to FIG. 2 and 3 of the drawings, a beryllium window 10 embodying the present invention largely comprises a beryllium plate 11 and a reinforcing frame 13 for retaining the beryllium plate 11. The beryllium plate 11 is mainly composed of beryllium, but any substance containing beryllium as an essential element may be available. In this instance, the beryllium plate 11 is of the order of 25 microns in thickness and has a disk-shaped configuration.

A welding film 12 is formed around the outer periphery of the beryllium plate 11, and is of the order of 10 microns in thickness. In this instance, the welding film is formed of nickel, however, one of silver, gold and copper may be used to form the welding film 12. In another implementation, the welding film 12 may be formed of any substance containing more than one elements selected from the group consisting of silver, gold, nickel and copper. The welding film 12 ranges from about 1 micron to about 200 microns in thickness. If the welding film 12 is thinner than about 1 micron, the amount of nickel is too small to achieve a sufficient adhesion. Any welding film more than 200 microns is also undesirable in view of strong welding.

The reinforcing frame 13 comprises a retaining member 13a and a pressing member 13b. In this instance, the retaining member 13a is formed of a stainless steel such as, for example, SUS 304 or SUS 430 in the JIS (Japanese Industrial Standards) rules. The retaining member 13a is generally circular in shape, and the inner aperture 13c is smaller in diameter than the beryllium plate 11. The inner peripheral portion of the retaining member 13a is thinner than the outer peripheral portion thereof, and a step configuration takes place between the inner peripheral portion and the outer peripheral portion. The beryllium window 11 is mounted on the retaining member 13a in such a manner that the welding film 12 is held in contact with the inner peripheral portion of the beryllium plate 11. The beryllium plate 11 and, accordingly, the welding film 12 are sandwiched between the retaining member 13a and the pressing member 13b, and the welding film 12 is partially diffused into the retaining member 13a as well as the beryllium plate 11 for welding the beryllium plate 11 to the retaining member 13a. As described hereinbelow in detail in connection with a process sequence, a diffusion welding technique is used for the assembly. The pressing member 13b is also shaped into a ring configuration and has a ring-shaped projection on the inner peripheral portion thereof. The pressing member 13b is larger in diameter than the beryllium plate 11 and smaller than the retaining member 13a. However, the ring-shaped projection has the outer diameter approximately equal to that of the beryllium plate 11. The ring-shaped projection of the pressing member 13b is inserted into the retaining member 13a and provides a protection to the beryllium window 10.

Description is hereinbelow made on a process of fabricating a beryllium window according to the present invention with reference to FIGS. 4A to 4F of the drawings.

Figure 4A:
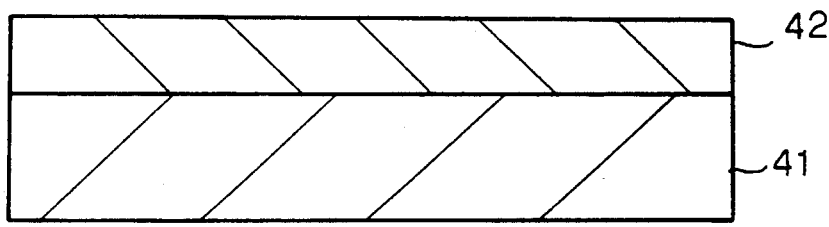
FIGS. 4A to 4F are cross sectional views showing the sequence of a process of fabricating a beryllium window according to the present invention.

A process sequence starts with preparation of a disk-shaped copper plate 41, and a beryllium film 42 is deposited to a thickness of about 25 microns on the entire surface of the disk-shaped copper plate 41. In this instance, the deposition of the beryllium plate 42 is carried out through a vacuum evaporation of beryllium. The resultant structure of this stage is shown in FIG. 4A.

Figure 4B:
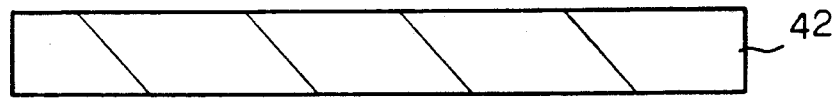

After the deposition of the beryllium film 42, the disk-shaped copper plate 41 is etched away in a solution of nitric acid. The copper-plate 41 is removed from the structure, and, then, the disk-shaped beryllium plate 42 is left as shown in FIG. 4B.

Figure 4C:
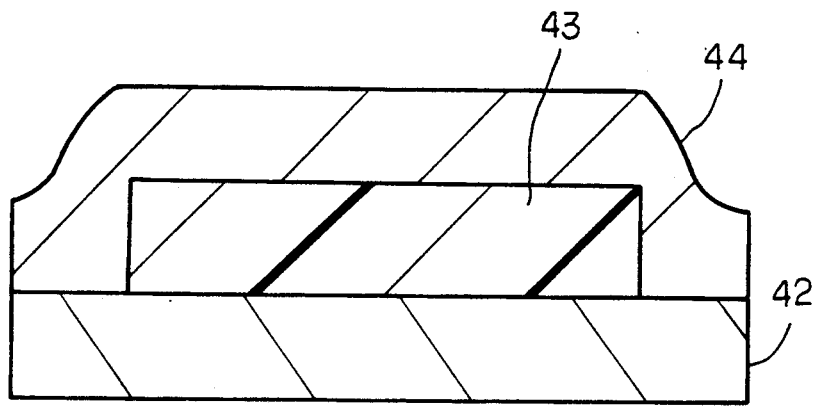

An appropriate mask layer 43 is formed on a central portion of the beryllium plate 42 through, for example, lithographic techniques and exposes the outer peripheral portion of the beryllium plate 42. Silver is deposited to a thickness of about 20 microns on the entire surface of the structure by using, for example, a vacuum evaporation technique as shown in FIG. 4C. However, the silver film may be deposited through another vapor-phase deposition technique, and the vapor-phase deposition includes both physical and chemical vapor-phase deposition techniques.

Figure 4D:
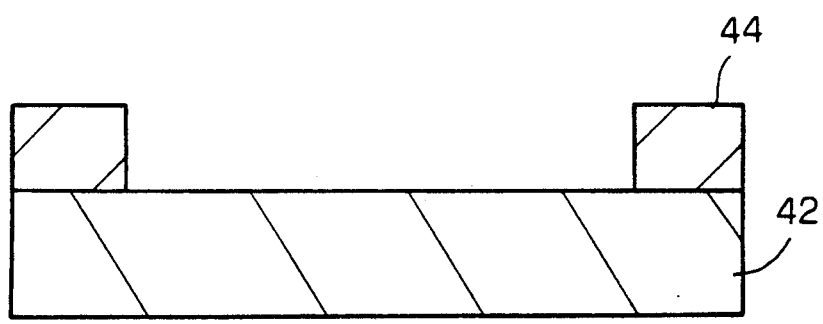

The mask layer 43 is stripped off so that only a ring-shaped silver film 44 is left on the outer peripheral portion of the beryllium plate 42 as shown in FIG. 4D. The ring-shaped silver film 44 serves as a welding film.

Figure 4E:
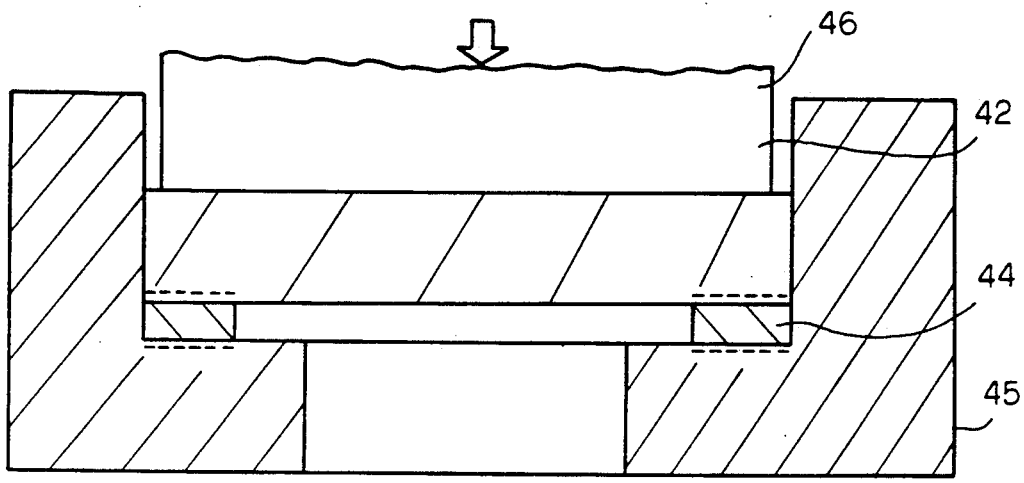

The beryllium film 42 is placed on a retaining member 45 in such a manner that the ring-shaped silver film 44 is held in contact with the inner peripheral portion of the retaining member 45. The beryllium film 42 thus mounted on the retaining member 45 is placed in a vacuum ambience of about $10^{-5}$ torr at about 650 degrees in centigrade. The beryllium plate 42 and, accordingly, the ring-shaped silver film 44 are pressed at 10 $kg/mm^2$ against the inner peripheral portion of the retaining member 45 with, for example, a suitable plunger 46 for about 30 minutes as shown in FIG. 4E. The silver atoms are diffused into the beryllium plate 42 as well as into the retaining member 45, and the welding film 44 is merged into the outer peripheral portion of the beryllium plate 42 and into the inner peripheral portion of the retaining member 45. In other words, the beryllium plate 42 is welded to the retaining member 45.

In this instance, the pressure exerted on the beryllium plate 42 is adjusted to about 10 $kg/mm^2$, however, the pressure may range from about 1 $kg/mm^2$ to about 100 $kg/mm^2$. If the pressure is lower than about 1 $kg/mm^2$, the diffusion welding hardly takes place between the beryllium plate 42 and the retaining member 45. A pressure larger than 100 $kg/mm^2$ is causative of undesirable deformation of the outer peripheral portion of the beryllium plate 42 and the inner peripheral portion of the retaining member 45.

The vacuum ambience is preferably heated at about 300 degrees to 900 degrees in centrigrade. A vacuum ambience lower than 300 degrees in centigrade is not high enough to diffuse the silver, and the diffusion of silver is excessively promoted in a vacuum ambience higher than 900 degrees in centigrade. Such an excessive diffusion deteriorates the mechanical strength at the welded spot between the beryllium plate 42 and the retaining member 45.

In this instance, the beryllium plate 42 is maintained for 30 minutes. However, the time period may range between 30 minutes and 120 minutes. If the time period is shorter than 30 minutes, any sufficient diffusion welding is hardly achieved. Even though the time period exceeds 120 minutes, no substantial improvement of welding is hardly achieved, and, therefore, such a long time period is too expensive in view of the production cost.

The vacuum ambience may be fallen within a range between $10^{-2}$ torr and $10^{-6}$ torr. If the pressure of a vacuum ambience is greater than $10^{-2}$ torr, the surface of the beryllium plate 42 and the surface of the welding film 44 are rapidly oxidized, and the oxide films suppresses the diffusion of silver. A vacuum ambience less than $10^{-6}$ requests the manufacturer an expensive evacuation system, and the expensive evacuation system increases the production cost of the beryllium window.

Figure 4F:
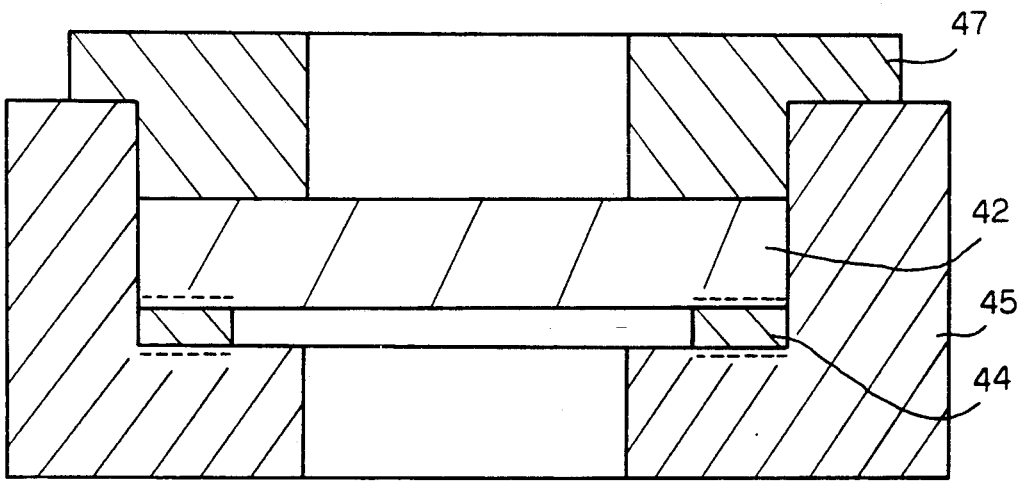

The beryllium plate 42 thus welded to the retaining member 45 is taken out from the vacuum chamber, and a pressing member 47 is inserted into the retaining member 45 as shown in FIG. 4F so as to provide an appropriate protection to the beryllium plate 42. In this instance, the retaining member 45 and the pressing member 47 form in combination a reinforcing unit.

The melting point of silver is as high as about 960 degrees in centigrade, and, for this reason, the beryllium window according to the present invention well withstands a baking treatment at 200 degrees to 400 degrees. Since the beryllium plate 42 is welded to the retaining member 45 through the diffusion of the welding substance, the beryllium plate 42 is fixed to the retaining member 45 in a low temperature process, and the beryllium plate 42 is not subjected to a serious heat impact. For this reason, the mechanical strength of the beryllium plate 42 is not deteriorated, and the beryllium plate 42 incorporated in the beryllium window according to the present invention is less deformative. This results in an extremely thin beryllium plate with a large transmissibility without sacrifice of mechanical strength, and, therefore, the beryllium window equipped with the beryllium plate is preferable to an x-ray radiation system such as, for example, an x-ray aligner.

Moreover, the welding film 44 is deposited on the beryllium plate 42 through the vacuum evaporation, and such a low-temperature vapor-phase deposition less damages the beryllium plate 42. This also improves the properties of the beryllium plate and, accordingly, the beryllium window according to the present invention.

As will be understood from the foregoing description, the beryllium window according to the present invention is improved in transmissibility without sacrifice of the mechanical strength, because the beryllium plate is hardly damaged in the diffusion welding.

Second Embodiment

The second embodiment is featured by a fabrication process, but the final structure is similar to that of the first embodiment. No further description on the structure is incorporated hereinbelow.

Figure 5:
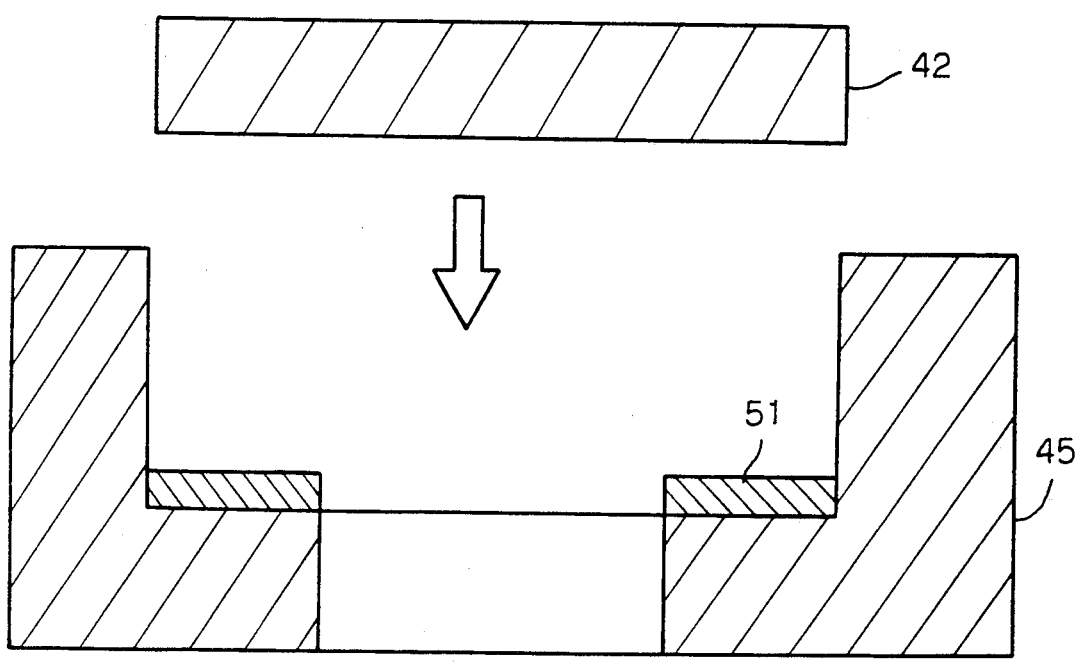
FIG. 5 is a cross sectional view showing an essential step of another process sequence according to the present invention.

The second process sequence traces the steps shown in FIGS. 4A to 4B as well as FIGS. 4E and 4F, however, a step shown in FIG. 5 is inserted between the steps shown in FIGS. 4B and 4E instead of the steps shown in FIGS. 4C and 4D. Namely, a welding film 51 is formed on the inner peripheral portion of the retaining member 45, and a foil-shaped welding substance may be used for formation of the welding film 51. The welding substance also contains one or more than one elements selected from the group consisting of silver, gold, nickel and copper. After the formation of the welding film 51, the beryllium plate 42 is inserted into the retaining member 45 and pressed against the welding film 51. In a high-temperature vacuum ambience, the welding film 51 welds the beryllium plate 42 to the retaining member 45 through diffusion of the welding substance into both of the beryllium plate 42 and the retaining member 45. The beryllium window thus fabricated is also thin enough to transmit an x-ray without sacrifice of mechanical strength as similar to the first embodiment described hereinbefore.

Although particular embodiments of the present invention have been shown and described, it will be obvious to those skilled in the art that various changes and modifications may be made without departing from the spirit and scope of the present invention. For example, the beryllium plate 11 may be formed of a beryllium alloy in, for example, the Be—Al system, the Be—Si system, the Be—Ni system or the Be—Li system.

What is claimed is:

1. A beryllium window for transmitting x-ray radiation comprising:
   a) a beryllium plate containing beryllium as an essential element;
   b) a reinforcing unit for retaining said beryllium plate; and
   c) a welding film diffused into a part of the beryllium plate and a part of the reinforcing unit through a diffusion phenomenon, said welding film being formed of a substrate having at least one element selected from the group consisting of silver, gold, nickel and copper, the reinforcing unit being formed of a substance allowing the at least one element to diffuse thereinto.

2. A beryllium window as set forth in claim 1, in which said reinforcing unit comprises a retaining member formed of a stainless steel.

3. A beryllium window as set forth in claim 1, in which said welding film ranges from about 1 micron to about 200 microns in thickness.

4. A beryllium window as set forth in claim 1, in which said beryllium plate is as thin as about 25 microns.

5. A beryllium window as set forth in claim 2, in which said beryllium plate is shaped into a disk configuration, and in which said retaining member is shaped into a ring configuration having an outer peripheral portion thicker than an inner peripheral portion, said beryllium plate being mounted on said retaining member in such a manner that said welding film is held in contact with said inner peripheral portion.

6. A beryllium window as set forth in claim 5, in which said reinforcing unit further comprises a pressing member with a ring-shaped projection, and in which said ring-shaped projection is inserted into said reinforcing member for providing a protection to said beryllium plate.

7. A beryllium window as set forth in claim 2, in which said welding film is formed of a substance containing more than one element selected from the group consisting of silver, gold, nickel and copper.

8. A beryllium window used in an x-ray radiating system, a difference in pressure being exerted on said beryllium window, comprising:
   a) a beryllium plate essentially composed of beryllium and shaped into a disk configuration, said beryllium plate being of the order of 25 microns in thickness;
   b) a welding film deposited on an outer peripheral portion of said beryllium plate and formed of nickel, said welding film being of the order of 10 microns in thickness;
   c) a retaining member formed of a stainless steel and generally shaped into a ring configuration, said retaining member having an inner peripheral portion thinner than an outer peripheral portion of said retaining member for producing a step configuration therebetween, said welding film being partially merged into said outer peripheral portion of said beryllium plate and into said inner peripheral portion of said retaining member through a diffusion welding; and d) a pressing member having a ring-shaped projection projecting from an inner peripheral portion thereof, said ring-shaped projection being inserted into said retaining member for providing a protection to said beryllium plate.

9. A process of fabricating a beryllium window for transmitting x-ray radiation comprising the steps of:
a) preparing a beryllium plate containing beryllium as an essential element, a welding substance containing at least one element selected from the group consisting of silver, gold, nickel and copper, and a reinforcing unit formed of a substance allowing said at least one element of diffuse thereinto;
b) forming a film of said welding substance on a part of said beryllium plate; and
c) welding said beryllium plate to said reinforcing unit through a diffusion of said welding substance into said beryllium plate and said reinforcing unit.

10. A process of fabricating a beryllium window as set forth in claim 9, in which said reinforcing unit comprises a retaining member formed of a stainless steel.

11. A process of fabricating a beryllium window as set forth in claim 9, in which said film of said welding substance is deposited on the part of said beryllium film by using a vapor phase deposition technique.

12. A process of fabricating a beryllium window as set forth in claim 11, in which said vapor phase deposition technique is a vacuum evaporation.

13. A process of fabricating a beryllium window as set forth in claim 9, in which said diffusion welding is carried out in a vacuum ambience ranging from about $10^{-2}$ torr to about $10^{-6}$ torr.

14. A process of fabricating a beryllium window as set forth in claim 13, in which said vacuum ambience is heated at 300 degrees to 900 degrees in centigrade.

15. A process of fabricating a beryllium window as set forth in claim 14, in which said beryllium plate and said film of said welding substance are pressed at 1 kg/mm$^2$ to 100 kg/mm$^2$ against said reinforcing unit.

16. A process of fabricating a beryllium window as set forth in claim 15, in which said beryllium plate and said film of said welding substance are pressed against said reinforcing unit for a predetermined time period ranging from about 30 minutes to about 120 minutes.

17. A process of fabricating a beryllium window as set forth in claim 9, in which said welding substance further contains another element selected from the group consisting of silver, gold, nickel and copper.

18. A process of fabricating a beryllium window used in an x-ray tube for transmitting x-ray, a difference in pressure being exerted on said beryllium window, comprising the steps of:
a) preparing a beryllium plate containing beryllium as an essential element, a welding substance containing at least one element selected from the group consisting of silver, gold, nickel and copper, and a reinforcing unit formed of a substance allowing said at least one element to diffuse thereinto;
b) forming a film of said welding substance on a part of said reinforcing unit; and
c) welding said beryllium plate to said reinforcing unit through a diffusion of said welding substance into said beryllium plate and said reinforcing unit.

* * * * *

UNITED STATES PATENT AND TRADEMARK OFFICE
CERTIFICATE OF CORRECTION

PATENT NO. : 5,161,179
DATED : November 3, 1992
INVENTOR(S) : Kunio SUZUKI et al It is certified that error appears in the above-identified patent and that said Letters Patent is hereby corrected as shown below:

On the title page, please add the following:

"[30]    Foreign Application Priority Data

March 1, 1990 [JP]  Japan.........................2-50129"

Signed and Sealed this

Twenty-eighth Day of September, 1993

Attest:

BRUCE LEHMAN

*Attesting Officer*        *Commissioner of Patents and Trademarks*